UNITED STATES PATENT OFFICE.

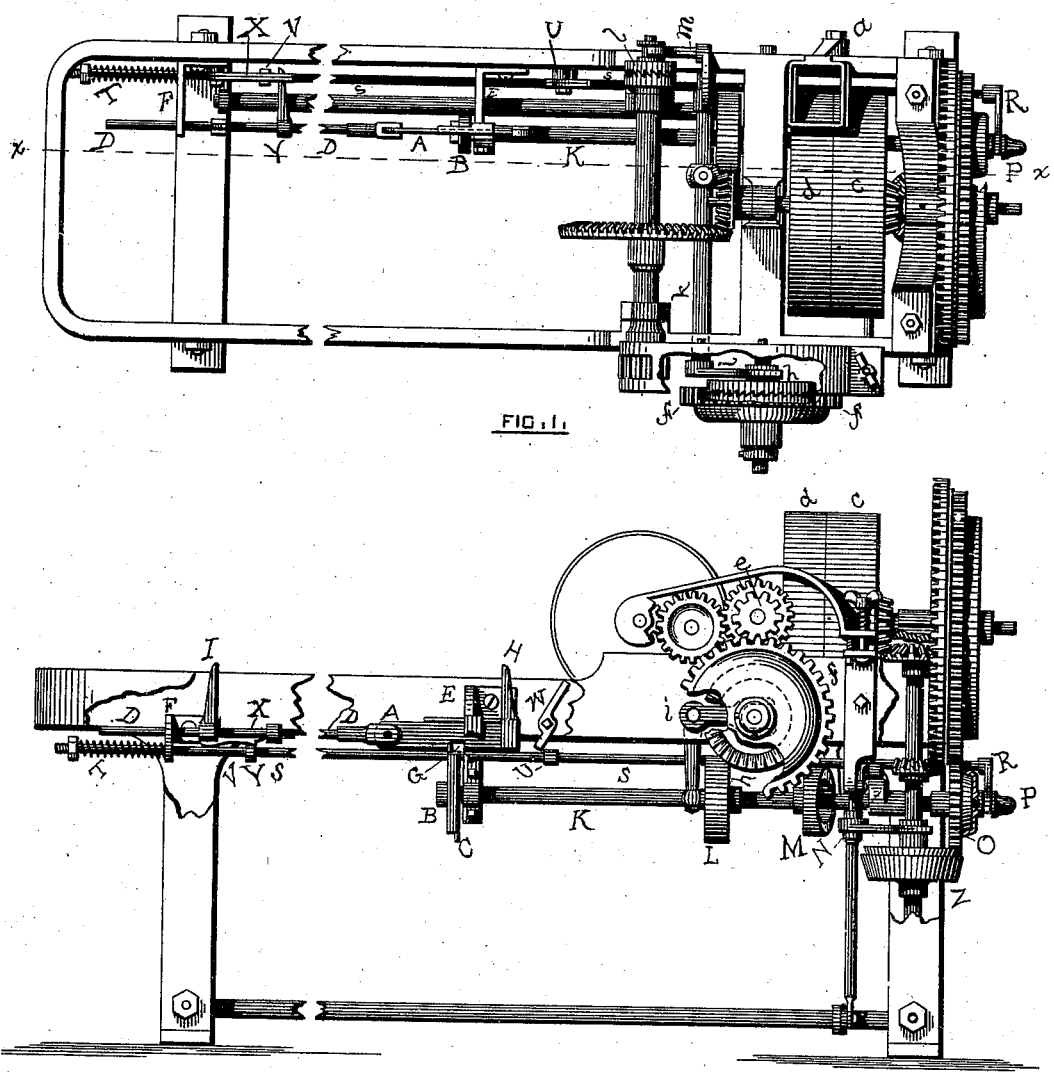

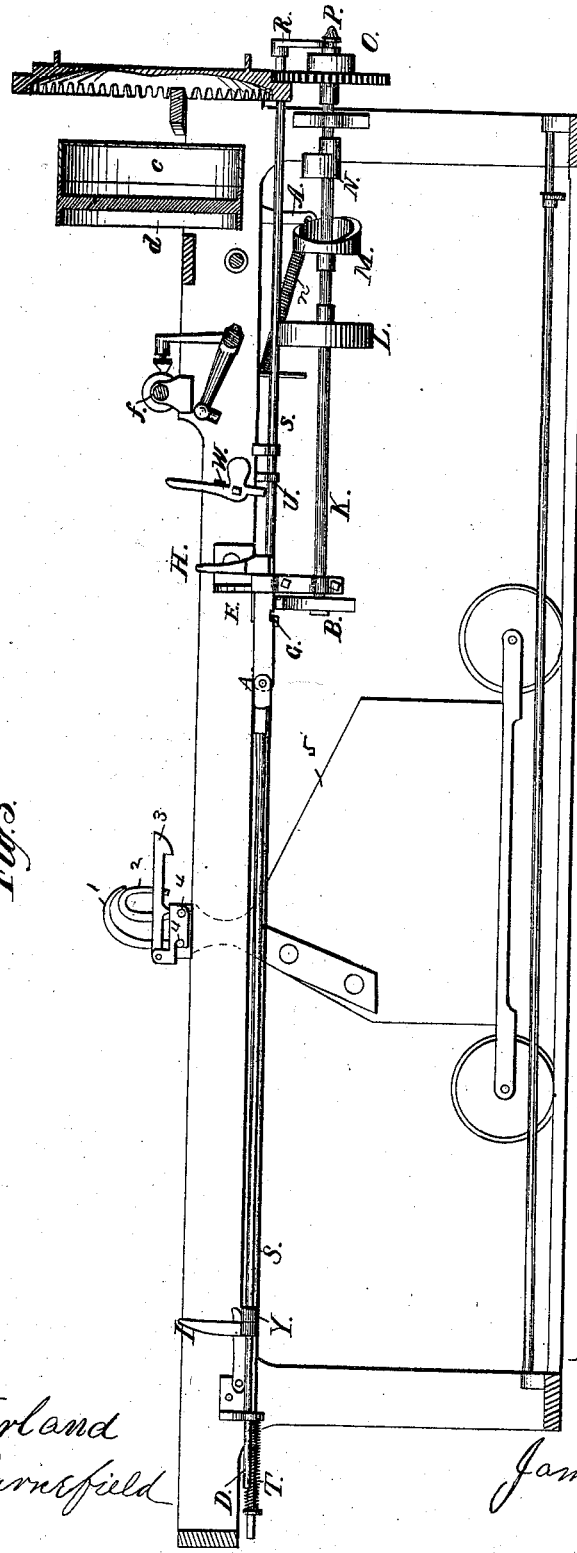

JAMES S. BROWN, OF PAWTUCKET, RHODE ISLAND.

IMPROVEMENT IN SPINNING-MULES.

Specification forming part of Letters Patent No. 174,349, dated March 7, 1876; application filed February 19, 1875.

*To all whom it may concern:*

Be it known that I, JAMES S. BROWN, of Pawtucket, in the county of Providence and State of Rhode Island, have invented certain Improvements in Mules for Spinning, of which the following is a specification:

My said invention is an improved means for reversing the motion by which the forward-and-backward or backing-off and coming-in movement is imparted to the mule-carriage, and by which the mule-head is connected with and disconnected from the roller-beam.

The accompanying drawing is hereby made a part of this specification, similar letters of reference thereon indicating corresponding parts.

Figure 1 of said drawing is a top view of the operating parts of a mule-head having my said improvements attached thereto; and Fig. 2 is a side view of the same, portions of certain exterior parts being torn away in both figures in order to show interior or under parts. Fig. 3 is a longitudinal vertical sectional view taken on the line *x x* of Fig. 1, having added thereto the carriage, fallers, &c. (Not shown in Figs. 1 and 2.)

The novel features comprising my said invention consist substantially as follows:

First. In place of the catch-box, lever, and other devices commonly used in the center of the head, I use a sliding gate, marked A on said drawing, in connection with a revolving dog, B, which has the fingers C at either end, but projecting from opposite sides thereof. This gate is permanently attached to the rod D extended between the supports E F, and the gate proper has the slot G in its under side, which slot, when brought immediately over the upper finger C, allows said finger to pass through and the dog B to make a half-revolution in the manner hereinafter described. At either end of the rod D are the upright arms H I, against which the faller-bars 4 4 impinge in their outward and inward motion, and thereby operate the sliding gate aforesaid. To make sure that the dog B shall not revolve except at the time when the slot is immediately over the uppermost finger projecting from said dog, I make said dog of a width exceeding the width of said slot. For instance, if the slot were one inch wide, I would make said dog one and one-half inch wide. The result is that when the upper finger has passed through the slot, and the finger projecting from the opposite side and from the other end of said dog is brought upward, the said slot is so far distant from said last-mentioned finger that the latter strikes against the body of the gate, and there remains until the said gate is again shifted and the said slot carried back directly over the last-mentioned finger. By this means the dog B is arrested at each half-revolution thereof and its connected parts are kept in proper position until the other changes have been effected.

Second. The dog B is attached to the end of the cam-shaft K, which shaft extends through the cams L, M, and N, and through the gear O, terminating in a conical friction-pulley seen at P. Attached to this friction-pulley, by means of the fork or clutch R, is the rod S, one end of which rod is permanently connected to the upper part of said clutch, the other end terminating beyond the nut which governs the spring T. Upon the rod S are the collars U V, the former of which is operated upon by the lever W in the manner hereinafter described. Immediately over the collar V is the latch X, so pivoted at one end that the notch near the other end will, by the weight of said latch, fall behind the collar V at the time of the aforesaid action of said lever W. On the rod D is a horizontal arm, Y, which, on the outward motion of said rod D, is carried under the cam-shaped end of said latch, raising the latch higher than the collar V, and thus permitting the spring T to perform its office, as hereinafter described. The gear O is loosely attached to the cam-shaft K, and while the gate A is closed will revolve without turning said shaft until said gate is opened in the manner aforesaid, and until the parts of said friction-pulley P are brought closely together in the manner substantially as follows: The faller-bars in their outward motion, when they strike the perpendicular arm I, carry the rod D in the same direction, and the connected horizontal arm Y at the same time raises the latch X. The liberated spring T then forces the rod S outward, and this movement of said rod, by means of the clutch R, closes together the two parts of the conical friction-pulley P. At this instant the outward movement of the rod D has so changed the position of the sliding gate A that the slot G is immediately over the uppermost finger on the dog B. This simultaneous opening of the gate A and closing of the parts of the friction-pulley P both cause and permit the half-revolution of the cam-shaft K. When the carriage has returned and starts to go outward again, a hook or clutch, 3, on one of the fallers automatically connects with the upper part of the lever W, which lever, on being drawn backward by the outward motion of said faller, impinges against the collar U and pushes the rod S forward, thus releasing or disconnecting the parts of the friction-pulley P. At the same time, and by the same movement, the shoulder or collar V is brought so far inward that the latch X falls behind it, and the rod S and its connections are thus firmly held in place until again released by the horizontal arm Y in the manner before described. The half-revolution of the cam-shaft K causes a similar half-revolution of the cams L, M, and N. The half-revolution of the cam N raises, and its subsequent half-revolution lowers, the upper part of the larger conical friction-pulley Z, substantially as in common use. A horizontal arm attached to the lower end of the belt-guide a has a continual bearing on the cam M through the operation of a spring, n, and is not materially different from that generally used. The repeated half-revolutions of this cam M cause the alternate shifting of the belt from one to the other of the pulleys c d. The cam L is the connection between the second part or feature of this device and the third.

Third. Instead of the devices by which the gearing e is now commonly raised and lowered for the purpose of connecting the same with and disconnecting it from the gear f, I substitute a catch-box. (Seen at h under the oval side of the gear f.) The inner half or part of this catch-box is connected with the horizontal shaft k by means of the fork or clutch i. This shaft is likewise connected with the outer half or part of the smaller catch-box l by means of the curved arm and clutch m, and said shaft has also a descending arm, the lower end of which has a shoulder working in the cam L. By one and the same half-revolution of the cam L the shaft k is moved so far in the direction of its length as to cause the respective parts or halves of the catch-boxes h and l to interlock with each other, the succeeding half-revolution of said cam L sliding the shaft k in the opposite direction, and thus releasing or separating the said respective parts of said catch-boxes l and h. The single movement of said shaft k in one direction closes both of said catch-boxes, and a single counter movement of said shaft uncouples or separates the halves or parts of both said catch-boxes. By this means the gearings e f are continually connected, but the gear f revolves loosely on its shaft when the parts of its interior catch-box h are disconnected, as before described. The interlocking and the disconnecting of these parts are attained through the horizontal movement of the shaft k, operated by the cam L, as above described, while by the old method this result is accomplished by the perpendicular raising and lowering of the gearing e and its connections.

The fallers are shown at 1 and 2 in Fig. 3 of the drawing. The faller-bars are marked 4 4, the hook or catch 3, and the carriage 5.

The remaining parts of the mule-head not specifically described are not materially different from those shown in the United States Patent No. 42,048, granted, March 22, 1864, to Robert Lakin and Jno. Wain, of Ardwick and Manchester, England.

I claim as my invention and desire to secure by Letters Patent—

1. In spinning-mules, the sliding gate A and revolving dog B, in combination with the cam-shaft K, all in the manner and for the purposes substantially as shown and described.

2. The combination of the cam L and horizontal shaft k, the latter provided with the descending arm and shoulder, as described, all in the manner and for the purposes substantially as set forth.

3. The combination of the cam L, shaft k, and clutches i m with the catch-boxes h and l, all substantially as described and shown.

4. The combination of the conical friction-pulley P with the lever W, rod S, having the collars U V, latch X, spring T, and rod D, having the horizontal arm Y, all in the manner and for the purposes substantially as shown and described.

JAMES S. BROWN.

Witnesses:
   THOS. P. BARNEFIELD,
   CHAS. A. WARLAND.